United States Patent
Shibata et al.

(10) Patent No.: US 7,326,484 B2
(45) Date of Patent: Feb. 5, 2008

(54) SOLID OXIDE FUEL CELL

(75) Inventors: Itaru Shibata, Kanagawa-ken (JP);
Tatsuo Sugiyama, Kanagawa-ken (JP);
Masaharu Hatano, Kanagawa-ken (JP); Mitsugu Yamanaka, Kanagawa-ken (JP); Makoto Uchiyama, Kanagawa-ken (JP); Tatsuhiro Fukuzawa, Kanagawa-ken (JP); Naoki Hara, Kanagawa-ken (JP); Keiko Kushibiki, Kanagawa-ken (JP); Fuminori Satou, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 296 days.

(21) Appl. No.: 11/088,892

(22) Filed: Mar. 25, 2005

(65) Prior Publication Data

US 2005/0186466 A1    Aug. 25, 2005

Related U.S. Application Data

(62) Division of application No. 10/046,918, filed on Jan. 17, 2002, now Pat. No. 6,893,760.

(30) Foreign Application Priority Data

Jan. 17, 2001 (JP) .............................. P2001-9394
May 15, 2001 (JP) .......................... P2001-144550

(51) Int. Cl.
*H01M 8/10* (2006.01)
*H01M 8/24* (2006.01)
*H01M 4/86* (2006.01)

(52) U.S. Cl. ............................ 429/30; 429/32; 429/40; 429/44

(58) Field of Classification Search .................. 429/30, 429/32, 40, 44, 45; 427/115; 502/101
See application file for complete search history.

(56) References Cited

U.S. PATENT DOCUMENTS 4,957,673 A    9/1990    Schroeder et al.

(Continued)

FOREIGN PATENT DOCUMENTS

EP    0 414 270 A2    8/1990

(Continued)

OTHER PUBLICATIONS

Kequin Huang et al., "A Solid Oxide Fuel Cell Based on Sr- and Mg-doped $LaGaO_3$ Electrolyte: The Role of a Rare-earth Oxide Buffer", 2000, Elsevier Science S.A., pp. 454-464, Journal of Alloys and Compounds, no month available.

(Continued)

*Primary Examiner*—Stephen J. Kalafut
(74) *Attorney, Agent, or Firm*—McDermott Will & Emery LLP

(57) ABSTRACT

A single cell for a fuel cell in which an air electrode or a fuel electrode includes at least two layers. The air electrode includes an adhering cathode layer formed on one surface of the solid electrolyte layer and configured to show a function to allow the air electrode and the solid electrolyte layer to adhere electrically and mechanically to each other, and an electricity collecting cathode layer formed on the adhering cathode layer and configured to show an electricity collecting function of the air electrode. Alternatively, the fuel electrode includes an adhering anode layer formed on the other surface of the solid electrolyte layer and configured to show a function to allow the fuel electrode and the solid electrolyte layer to adhere electrically and mechanically to each other, and an electricity collecting anode layer formed on the adhering anode layer and configured to show an electricity collecting function.

13 Claims, 6 Drawing Sheets

U.S. PATENT DOCUMENTS

| | | |
|---|---|---|
| 5,171,645 A | 12/1992 | Khandkar |
| 5,273,837 A | 12/1993 | Aitken et al. |
| 5,543,241 A | 8/1996 | Nisioka et al. |
| 5,753,385 A | 5/1998 | Jankowski et al. |
| 5,993,989 A * | 11/1999 | Baozhen et al. .......... 429/40 X |
| 6,007,683 A | 12/1999 | Jankowski et al. |
| 6,139,985 A | 10/2000 | Borglum et al. |
| 6,939,637 B2 * | 9/2005 | Gorte et al. .............. 429/44 X |
| 2001/0044041 A1 | 11/2001 | Badding et al. |
| 2002/0177031 A1 | 11/2002 | Doshi et al. |

FOREIGN PATENT DOCUMENTS

| | | |
|---|---|---|
| EP | 0 466 418 A1 | 7/1991 |
| JP | 55-165501 | 12/1980 |
| JP | 01-227362 | 9/1989 |
| JP | 2-133862 | 11/1990 |
| JP | 5151981 | 6/1993 |
| JP | 6287048 | 10/1994 |
| JP | 09-063603 | 3/1997 |
| JP | 09-180731 A | 7/1997 |

OTHER PUBLICATIONS

IPDL JPO Machine Translation of JP-09-180731 A (publication date of Jul. 11, 1997).

European Search Report, issued in corresponding European Patent Application No. 02000884.3-1227, dated on Aug. 6, 2007.

* cited by examiner

FIG. 5

Table. 1

| | Air electrode (Ag) | | Fuel electrode (Ni) | | Peeling Property | Cell property (i=0.4A/cm² hour) |
|---|---|---|---|---|---|---|
| | Lower layer | Upper layer | Lower layer | Upper layer | | |
| Example 1 | Sputtering film: 50 nm | Sprayed film: 15 μm | Sputtering film: 50 nm | Sprayed film: 35 μm | OK | 0.130W/cm² |
| Comparative example 1 | — | Sprayed film: 15 μm | — | Sprayed film: 35 μm | OK | 0.12W/cm² |
| Example 2 | Sprayed film: 0.1 μm | Sprayed film: 15 μm | Sprayed film: 0.1 μm | Sprayed film: 35 μm | OK | 0.127W/cm² |
| Comparative example 2 | — | Sprayed film: 15 μm | — | Sprayed film: 35 μm | × | 0.123W/cm² |
| Comparative example 3 | Sputtering film: 2 μm | Sprayed film: 15 μm | Sputtering film: 2 μm | Sprayed film: 35 μm | × | 0.11W/cm² |

*) The lower layer and the upper layer in the air electrode are an adhering cathode layer and an electricity collecting cathode layer respectively.
*) The lower layer and the upper layer in the fuel electrode are an adhering anode layer and an electricity collecting anode layer respectively.

FIG.6

Tabl. 2

| Example No | Electrical collecting cathode layer | | Adhering cathode layer | | | | Adhesion strength | Resistance (Ω) | Cell resistance (Ω) |
|---|---|---|---|---|---|---|---|---|---|
| | Material | Particle diameter | Material | | Method | Baking temperature (°C) | | | |
| Example 3 | LSC | 5 μm | Ag | 1 μm | Sputtering | 800 | ○ | 0.05 | 2.3 |
| Example 4 | LSC | 5 μm | Bismuth oxide | 1 μm | EB deposition | 800 | ○ | 0.11 | 2.5 |
| Example 5 | LSC | 5 μm | Ag+LSC | 0.1 μm | Sputtering | 850 | ○ | 0.07 | 2.3 |
| Example 6 | LSC | 5 μm | Bismuth oxide + glass frit | 3 μm | Screen printing | 900 | ○ | 0.15 | 2.8 |
| Comparative example 4 | LSC | 5 μm | Nothing | — | — | 1100 | ○ | — | 350 |
| Comparative example 5 | LSC | 5 μm | Nothing | — | — | 800 | × | — | 12.5 |
| Comparative example 6 | LSC | 5 μm | Ag | 10 μm | Sputtering | 850 | ○ | 0.21 | 56.2 |
| Comparative example 7 | LSC | 5 μm | Bismuth oxide + glass frit | 2 μm | Screen printing | 500 | × | 0.18 | 3.5 |

SOLID OXIDE FUEL CELL

RELATED APPLICATIONS

This application is a divisional of U.S. patent application Ser. No. 10/046,918, filed Jan. 17, 2002, now U.S. Pat. No. 6,893,760, which is based on Japanese Patent Application Nos. P2001-9394, filed Jan. 17, 2001 and P2001-144550, filed May 15, 2001 and the contents of which are hereby incorporated by reference.

BACKGROUND OF THE INVENTION

1. Field of the Invention

The present invention relates to a solid oxide fuel cell (SOFC) which uses a solid electrolyte to obtain electric energy by utilization of electrochemical reactions.

2. Description of the Related Art

Fuel cells have recently attracted considerable attention as a clean energy source which is capable of high energy conversion and globally environmentally friendly.

A solid oxide fuel cell (hereinafter referred to as "SOFC") is one having a structure in which two electrodes consisting of an air electrode (cathode) and a fuel electrode (anode) sandwich a solid oxide electrolyte layer. Reactive gas containing oxygen is supplied to the air electrode, and reactive gas containing fuel gas is supplied to the fuel electrode. An electrochemical reaction occurs at a three-phase interface where the electrode, the reactive gas and the solid electrolyte mainly contact. These electrode materials are required to offer the following properties 1) to 3).

1) To promote the electrochemical reaction at the electrode/electrolyte interface (i.e. the interface between the electrode and the electrolyte), the electrode materials have a structure which can obtain a large area of the three-phase interface formed by the electrode material, the electrolyte and the reactive gas.

2) The electrode materials have a structure which makes it easier to introduce the reactive gas into the electrode/electrolyte interface that is an electrochemical reaction field.

3) The electrode materials offer low electric resistance to enhance electricity collecting performance as the electrode.

To satisfy the properties of the items 1) and 2), the electrode must be porous, and to decrease its electric resistance, the electrode layer must have a sufficient thickness.

Accordingly, in order to offer the above described properties of the 1) to 3), with respect to the conventional electrode material, its micro powders were processed to be pasty, and coated onto the surface of the electrolyte layer by use of a printing method and a dipping method, followed by baking. Thus, the fuel electrode and the air electrode, which are a porous single-layer having a sufficient thickness, are respectively formed.

SUMMARY OF THE INVENTION

It is difficult for the conventional single-layered air and fuel electrodes to satisfy the foregoing three requirements. This is because to acquire high electricity collecting performance, the film thickness of the electrode must be thickened, however it is difficult to obtain a sufficient electrochemical reaction field to occur a cell reaction, that is, a wide area of the three-phase interface is impossible with the thick film thickness of the electrode.

In addition, the conventional air electrode and fuel electrode are formed by use of paste mixed with inorganic adhesive made of glass as a main component, and the inorganic adhesive does not participate in the electrochemical reaction or disturb the electrochemical reaction. Accordingly, to produce the electrochemical reaction more effectively, such an inorganic adhesive should not be mixed.

Furthermore, LSC (lanthanum-strontium-cobalt complex oxide) has been recently used as an air electrode material of SOFC for a low temperature (below 800° C.) operation. Since the LSC offers both of electron conductivity and ion conductivity, oxygen as reactive gas can diffuse into the electrode. Accordingly, the LSC can cause an electrochemical reaction necessary for a cell reaction not only at the three-phase interface but also at the two-phase interface. However, when YSZ (yttria-stabilized-zirconia) is used as a solid electrolyte, the LSC reacts with the YSZ at 1000° C. or more, resulting in deterioration of cell performance.

The present invention was made in consideration for the foregoing subjects, and a first object of the present invention is to provide a single cell having an electrode structure which shows small electrical resistance, good adhesion, and can provide a large three-phase interface or a broad two-phase interface necessary for a cell reaction. A second object of the present invention is to provide a cell plate configured by laminating the single cell. A third object of the present invention is to provide a method of manufacturing the same, and to provide a solid oxide fuel cell comprising the same.

To achieve the above objects, a single cell for a fuel cell of the present invention has a structure in which a solid electrolyte layer is sandwiched by an air electrode and a fuel electrode, and the air electrode or the fuel electrode is configured by at least two layers.

A single cell according to a first aspect of the present invention, includes an air electrode formed of at least two layers. The air electrode contains an adhering cathode layer formed on one surface of the solid electrolyte layer and configured to principally show a function to allow the air electrode and the solid electrolyte layer to adhere electrically and mechanically to each other; and an electricity collecting cathode layer formed on the adhering cathode layer and configured to principally show an electricity collecting function of the air electrode. The adhering cathode layer has a structure denser than the electricity collecting cathode layer, and configures a three-phase interface, in which an electrochemical reaction occurs, composed of the solid electrolyte layer, reactive gas and the air electrode. The electricity collecting cathode layer has pores providing the reactive gas to the three-phase interface sufficiently.

A single cell according to a second aspect of the present invention, includes a fuel electrode formed of at least two layers. The fuel electrode includes an adhering anode layer formed on the other surface of the solid electrolyte layer and configured to principally show a function to allow the fuel electrode and the solid electrolyte layer to adhere electrically and mechanically to each other; and an electricity collecting anode layer formed on the adhering anode layer and configured to principally show an electricity collecting function. The adhering anode layer has a structure denser than the electricity collecting anode layer, and configures a three-phase interface, in which an electrochemical reaction occurs, composed of the solid electrolyte layer, reactive gas and the fuel electrode, and the electricity collecting anode layer has pores for providing sufficient reactive gas to the three-phase interface.

A cell plate for a fuel cell of a third aspect of the present invention is configured by two-dimensionally analyzing single cells for the fuel cell of the present invention, and then these cells are processed to a united cell plate.

A fuel cell of a fourth aspect of the present invention is configured by laminating the cell plate for the fuel cell of the present invention.

A method of manufacturing the single cell for the fuel cell of a fifth aspect of the present invention, by use of any of a physical vapor deposition (PVD) method, a chemical vapor deposition (CVD) method and a plating method, a solid electrolyte layer is first formed and then an adhering anode layer is formed on one surface of the solid electrolyte layer and an adhering cathode layer is formed on the other surface of the solid electrolyte layer. Furthermore, by use of one of a spray coating method and a printing method, an electricity collecting anode layer is formed on the adhering anode layer and an electricity collecting cathode layer is formed on the adhering cathode layer, followed by baking the electricity collecting anode layer and the electricity collecting cathode layer after formation of the electricity collecting anode layer and the electricity collecting cathode layer.

BRIEF DESCRIPTION OF THE DRAWINGS

FIG. 5 is a table showing conditions and cell properties according to the examples 1 and 2 and the comparative examples 1 to 3.

FIG. 6 is a table showing conditions and cell properties according to examples 3 to 6 and comparative examples 4 to 7.

DETAILED DESCRIPTION OF THE EMBODIMENTS

Descriptions for a single cell and a cell plate of a solid oxide fuel cell according to each embodiment of the present invention will be described in detail below. In this specification, the symbol "%" indicates a mass percentage unless specifically mentioned.

Furthermore, for the sake of convenience of explanations, one surface of each layer such as a substrate and an electrode layer is described as "upper surface" and the other surface is described as "lower surface". However, these are equivalent constituent components, and, as a matter of course, constitutions in which these components are replaced by one another are within the scope of the present invention.

First Embodiment

Figure 1A:
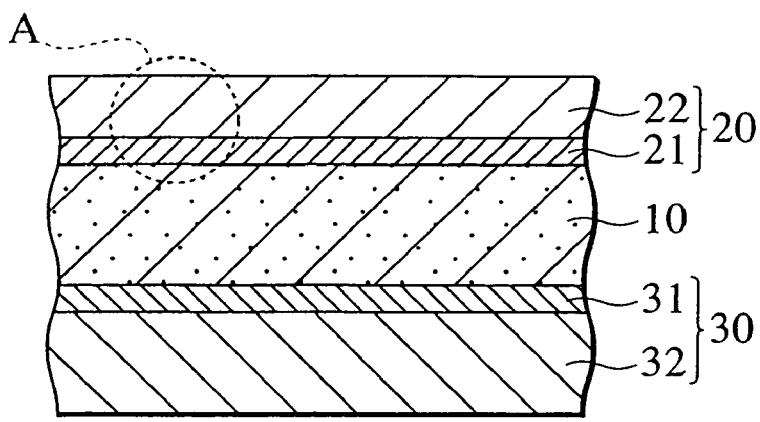
FIG. 1A is a section view of a single cell according to a first embodiment of the present invention.
Figure 1B:
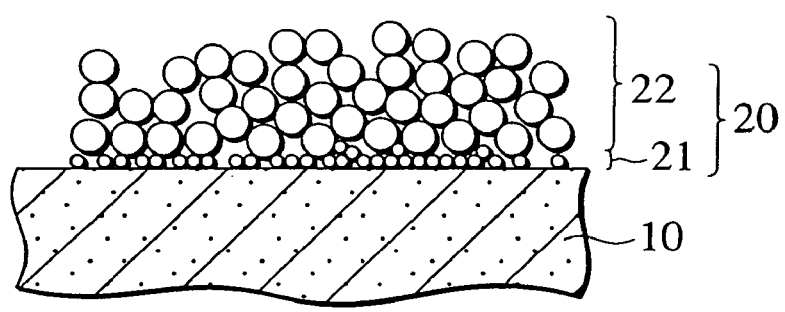
FIG. 1B is an enlarged section view of a portion A in FIG. 1A.

FIG. 1A shows a structure of a single cell according to a first embodiment of the present invention. Also FIG. 1B shows an enlarged section view of a portion A circled with broken line in FIG. 1A. The single cell has the structure in which the solid electrolyte layer 10 is sandwiched by the air electrode (cathode) 20 and a fuel electrode (anode) 30. The single cell of this embodiment has a feature in that the air electrode 20 and the fuel electrode 30 are respectively formed by at least two layers, each of which has a different function.

To be concrete, as shown in FIG. 1A, the air electrode 20 has a laminated structure composed of an adhering cathode layer 21 formed on the upper surface of the solid electrolyte layer 10 and an electricity collecting cathode layer 22. The fuel electrode 30 has a laminated structure composed of an adhering anode layer 31 formed on the lower surface of the solid electrolyte layer 10 and an electricity collecting anode layer 32.

The adhering cathode layer 21 in the air electrode 20 is one having a main function which adheres the air electrode 20 to the solid electrolyte layer 10. Furthermore, the adhering cathode layer 21 in the air electrode 20 is one constituting a three-phase interface or a two-phase interface that is an electrochemical reaction field required for a cell reaction. The electricity collecting cathode layer 22 is one having a main function to collect electricity of the air electrode 20.

Similarly, the adhering anode layer 31 in the fuel electrode 30 is one having a main function to adhere the fuel electrode 30 to the solid electrolyte layer 10. Furthermore the adhering anode layer 31 in the fuel electrode 30 is one constituting a three-phase interface that is an electrochemical reaction field required for a cell reaction. The electricity collecting anode layer 32 in the fuel electrode 30 is one mainly having an electricity collecting function.

The adhering cathode layer 21 and the adhering anode layer 31 offer electrically and mechanically high adhesion to the solid electrolyte layer 10, and though the adhering cathode layer 21 and the adhering anode layer 31 are discontinuous, they should be a conductive layer having a dense film structure, to obtain a sufficient three or two-phase interface.

On the other hand, to acquire a high electricity collecting function, the electricity collecting cathode layer 22 and the electricity collecting anode layer 32 should be formed of an electrically conductive layer having a sufficient thickness to reduce electrode resistance. Furthermore, to supply sufficient reactive gas to the three-phase interface where the cell reaction occurs, the electricity collecting cathode layer 22 and the electricity collecting anode layer 32 should have a porous structure through which the reactive gas can pass.

As described above, by respectively constituting the air electrode 20 and the fuel electrode 30 by a plurality of electrode layers, each of which has a different function, it is possible to give good electrode performance, which cannot be achieved by a single-layered electrode layer, to the air electrode 20 and the fuel electrode 30. Specifically, the adhering cathode layer 21 enhances adhesion of the air electrode 20 to the solid electrolyte layer 10 more effectively, and forms the three or two-phase interface contributing to more cell reactions in the interface between the air electrode 20 and the solid electrolyte layer 10. The electricity collecting cathode layer 22 increases the electricity collecting performance more effectively, and makes it easier to be electrically connected to the outside. Furthermore, the electricity collecting cathode layer 22 supplies reactive gas more effectively to the three-phase interface that is a reaction field where a cell reaction occurs. Since sufficient adhesion can be obtained due to the existence of the adhering cathode layer 21, use of materials such as glass paste for adherence of the electrode layers can be omitted, which do not participate in the cell reaction or disturb the cell reaction. Accordingly, efficiency of the cell reaction can be enhanced.

Similarly, the adhering anode layer 31 enhances adhesion of the fuel electrode 30 to the solid electrolyte layer 10 more effectively, and forms the three-phase interface contributing to more cell reactions in the interface between the fuel electrode 30 and the solid electrolyte layer 10. Furthermore, the electricity collecting anode layer 32 enhances electricity collecting performance more effectively, and supplies the reactive gas more effectively by the reaction field where the cell reaction occurs. When single cells are integrated two-dimensionally to form a cell plate, and when the cell plates are further laminated, electric resistance between the single cells and electric resistance between the cell plates can be reduced with the enhancement of the electricity collecting performance of the electrode.

Descriptions for the air electrode 20 and the fuel electrode 30 will be made more concretely below.

First, in the single cell of this embodiment, the electricity collecting cathode layer 22 should have a thickness thicker than that of the adhering cathode layer 21. This is because since the adhering cathode layer 21 is a dense film, it is difficult for the reactive gas to reach the three-phase interface when the thickness of the adhering cathode layer 21 is too thick. On the other hand, with respect to the electricity collecting cathode layer 22, this is because since it is necessary to decrease resistance of the electricity collecting cathode layer 22 sufficiently in order to collect electricity, the electricity collecting cathode layer 22 must have a thick thickness to some degree.

To be concrete, a ratio (tc1/tc2) of the thickness (tc1) of the adhering cathode layer 21 to the thickness (tc2) of the electricity collecting cathode layer 22 should range from 1/1000 to 1/500. Furthermore, the thickness of the adhering cathode layer 21 should be equal to 1 μm or less, and the thickness of the electricity collecting cathode layer 22 should be equal to 10 μm or more.

Similarly, a ratio (ta1/ta2) of a thickness (ta1) of the adhering anode layer 31 to a thickness (ta2) of the electricity collecting anode layer 32 should range from 1/1000 to 1/500. Furthermore, the thickness of the adhering anode layer 31 should be equal to 1 μm or less, and the thickness of the electricity collecting anode layer 32 should be equal to 10 μm or more.

Furthermore, the adhering cathode layer 21 and the adhering anode layer 31 (hereinafter referred to as "adhering electrode layers (21, 31)") should be formed of a conductive material having a particle diameter of 0.5 μm or less, and the electricity collecting cathode layer 22 and the electricity collecting anode layer 32 (hereinafter referred to as "electricity collecting electrode layers (22, 32)") should be formed of a material containing a conductive material having a particle diameter of 0.8 μm or more. When the particle diameter of the conductive material of the adhering electrode layers (21, 31) is made small, a density of contact points of the solid electrolyte layer 10 and the adhering electrode layers (21, 31) increases. Therefore, adhesion of the adhering electrode layers (21, 31) to the solid electrolyte layer 10 is improved. The increase in the density of the contact points increases a substantial area of the three-phase interface. Furthermore, by making the particle diameter of the conductive material of the electricity collecting electrode layers (22, 32) larger, porosity more increases, and permeability of the reactive gas can be increased. Accordingly, since the reactive gas can be supplied to the three-phase interface effectively, the cell reaction can be improved.

Furthermore, the adhering electrode layers (21, 31) should be discontinuous thin film layers. Here, the discontinuous thin film layer means a layer that is not a continuous thin film and not uniformly dense. In other words, the discontinuous thin film is a film showing a state where all portions of surfaces of individual particles do not necessarily contact others perfectly but the individual particles have portions that do not contact others. If the adhering electrode layers (21, 31) are continuous thin films that are uniformly dense, there is no room for the reactive gas to enter, and it is impossible to form the three-phase interface necessary for the cell reaction.

Furthermore, the electricity collecting electrode layers (22, 32) should adopt a three dimensional network structure or column structure in which individual constituent particles contact others and have pores therein. The network structure should be preferably adopted because the network structure secures a larger contact area of the reactive gas with the electrode layers and guarantees the electrical electricity collecting function. In addition, the network structure can promote permeability of the reactive gas.

Further, the electricity collecting electrode layers (22, 32) should have a ratio of the pores to the total volume (i.e. porosity), which ranges from 30 to 70 vol %. When the electricity collecting electrode layers (22, 32) contains the pores at this ratio, it is possible to secure good gas permeability. If the porosity is less than 30 vol %, the gas permeability is disturbed, and if the porosity is more than 70 vol %, a film strength may be insufficient. Also, such a pore should have a size of about 0.1 to 5 μm which is suitable for electrochemical reaction.

The electricity collecting electrode layers (22, 32) should be covered on the upper surface of the adhering electrode layers (21, 31) almost in a net form. By covering the layers (22, 32) on the adhering electrode layers (21, 31), it is possible to relax thermal distortion.

Note that as the foregoing solid electrolyte layer 10, it should be preferable to use one having a thickness of 100 μm or less. With the use of the solid electrolyte layer 10 having the thickness of 100 μm or less, a desired energy conversion efficiency can be achieved easily. When the thickness of the solid electrolyte layer 10 exceeds 100 μm, its specific resistance becomes larger, and the energy conversion efficiency is apt to be deteriorated.

Here, as a material of the adhering anode layer of the fuel electrode, any one of nickel (Ni); nickel-chromium (Cr) alloy; nickel-iron (Fe) alloy; metals which are combinations of any of these materials; and nickel oxide (NiO and Ni complex oxide) can be used. As a material of the electricity collecting anode layer of the fuel electrode, Ni. Ni—Cr, Ni—Fe, Pt, Ag, Ni—Cr—W—Mo alloy and Ni—Cr—Fe alloy can be used.

As a material of the adhering cathode layer of the air electrode, any one of silver (Ag), platinum (Pt), gold (Au), titanium (Ti), tungsten (W), lanthanum (La), strontium (Sr), cobalt (Co), iron (Fe), manganese (Mg) and chromium (Cr) can be used. Moreover, alternatively, combinations of any of these metals can be used. Still furthermore, any one of $La_{0.3}Co_{0.7}O_3$, $La_{0.7}Sr_{0.3}CrO_3$, $La_{0.3}Sr_{0.3}FeO_3$, $La_{0.7}Sr_{0.3}MnO_3$ and $La_{0.7}Sr_{0.3}CrO_3$ and one containing lanthanum complex oxide which is combinations of any of these can be alternatively used. Further, as a material of the electricity collecting cathode layer of the air electrode, Ag, Pt or Au and one containing metals which are combinations of any of these can be used.

Moreover, as the solid electrolyte layer, a material providing oxygen ion conductivity, for example, stabilized zirconia doped with neodymium oxide ($Nd_2O_3$), samarium oxide ($Sm_2O_3$), yttria ($Y_2O_3$), gadolinium oxide ($Gd_2O_3$) and the like; ceria ($CeO_2$) series solid solution; bithmum oxide, and $LaGaO_3$ can be used. However, the material of the solid electrolyte layer is not limited to these materials.

Next, a method of manufacturing the single cell for the fuel cell of the first embodiment of the present invention will be described.

According to the method of manufacturing the single cell of the first embodiment of the present invention, the adhering cathode layer and the adhering anode layer are respectively formed on one surface and the other surface of the solid electrolyte layer by use of a vacuum film formation method. Subsequently, the electricity collecting cathode layer is formed on the adhering cathode layer by use of a printing method or a spray coating method. The electricity collecting anode layer is formed on the adhering anode layer by use of the printing method or the spray coating method. Thereafter, the aggregate of these layers are baked, to obtain the single cell for the fuel cell.

According to the above method of the single cell, since the adhering cathode layer and the adhering anode layer are respectively formed by use of the vacuum film formation method, these films are made to be a dense thin film having an excellent adhering function. In addition, since the electricity collecting cathode layer and the electricity collecting anode layer are formed by use of the printing method or the spray coating method, it is possible to easily form a comparatively porous and thick film. Accordingly, this manufacturing method is suitable for a fabrication method of the single cell of the first embodiment.

According to another method of manufacturing a single cell of the first embodiment of the present invention, the materials for forming the adhering cathode layer and the adhering anode layer are respectively covered on one surface and the other surface of the solid electrolyte layer by use of the spray coating method, and baked, thus forming the adhering cathode layer and the adhering anode layer. Furthermore, the electricity collecting cathode layer and the electricity collecting anode layer are respectively covered on the adhering cathode layer and the adhering anode layer by use of the printing method or the spray coating method, and then baked, thus forming the electricity collecting cathode layer on the adhering cathode layer and the electricity collecting anode layer on the adhering anode layer respectively. Thus, the single cell according to another embodiment of the present invention is fabricated. According to this method, since the adhering electrode layers and the electricity collecting electrode layers can be formed in the same process, the manufacture of the single cell is made easier.

Second Embodiment

Figure 2:
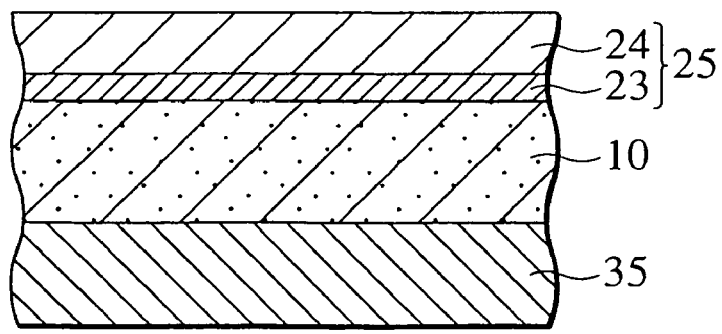
FIG. 2 is a section view of a single cell according to a second embodiment of the present invention.

A structure of a single cell according to a second embodiment of the present invention is shown in FIG. 2. Air electrode 25 is formed on one surface of the solid electrolyte layer 10, and a fuel electrode 35 is formed on the other surface thereof. The air electrode 25 have an adhering cathode layer 23 and an electricity collecting cathode layer 24.

In the single cell of the second embodiment, an ion electron conduction film providing electron conductivity and ion conductivity is used as the adhering cathode layer 23 and the electricity collecting cathode layer 24 of the air electrode 25, and electrode performance of the air electrode 25 is enhanced. Moreover, as the adhering cathode layer 23, silver (Ag), a material essentially containing silver (Ag), bismuth oxide (Bi), or a material essentially containing the bismuth oxide is used.

Since Ag and bismuth oxide exhibit the electron conductivity and the ion conductivity and have a low melting point, the air electrode can be adhered to the solid electrolyte layer at a low temperature. Accordingly, since a temperature required to form the air electrode can be decreased, a high temperature reaction between the electrode and the solid electrolyte layer can be suppressed. A material such as LSC can be used as the electricity collecting cathode layer 24, and good adhesion and conductivity can be secured.

When Ag or a material essentially containing Ag is used as the adhering cathode layer 23, the electricity collecting cathode layer 24 should contain one of nickel (Ni), nickel-chromium (Ni—Cr) alloy and nickel-iron (Ni—Fe) alloy; combinations of any of these materials. Alternatively, the electricity collecting cathode layer 24 should contain nickel oxide and one of silver (Ag), platinum (Pt), gold (Au), titanium (Ti), tungsten (W), lanthanum (La), strontium (Sr), cobalt (Co), iron (Fe), manganese (Mn), chromium (Cr) and combinations of any of these metals. Otherwise, the electricity collecting cathode layer 24 should contain one of $La_{0.3}Co_{0.7}O_3$, $La_{0.7}Sr_{0.3}CrO_3$, $La_{0.7}Sr_{0.3}FeO_3$, $La_{0.7}Sr_{0.3}MnO_3$ and $La_{0.7}Sr_{0.3}CrO_3$; or one containing lanthanum complex oxide which is a combination of any of these.

Furthermore, when bismuth oxide and a material essentially containing the bismuth oxide is used as the adhering cathode layer 23, the electricity collecting cathode layer 24 should contain at least one metal selected from the group consisting of silver, platinum, gold, titanium, tungsten, lanthanum, strontium, cobalt, iron, manganese and chromium. Alternatively, the electricity collecting cathode layer 24 should contain lanthanum complex oxide selected from the group consisting of $La_{0.3}Co_{0.7}O_3$, $La_{0.7}Sr_{0.3}CrO_3$, $La_{0.7}Sr_{0.3}FeO_3$, $La_{0.7}Sr_{0.3}MnO_3$ and $La_{0.7}Sr_{0.3}CrO_3$.

Resistance of the adhering cathode layer 23 should be equal to 10% of the total resistance of the single cell or less.

It is preferable to constitute the single cell so that the film thickness tc1 of the adhering cathode 23 and the average particle diameter dc of the constituent particles of the air electrode 25 have a certain relation between them. In this case, when the single cell is constituted so as to create such a relation between them, adhesion of the solid electrolyte layer and the electrode can be enhanced effectively without decreasing the cell performance.

A single cell structure should be adopted, which satisfies, for example, a relation expressed by $tc1 \leq dc$ where tc1 is the film thickness of the adhering cathode layer and dc is the average particle diameter of the foregoing electrode constituent particles. Note that in the case of tc1>dc, a gas diffusion property within the electrode is deteriorated and an electrical output of the single cell may be lowered.

Also, a single cell structure should be adopted, which satisfies a relation expressed by $0.01dc \leq tc1 \leq 0.5dc$ where tc1 is the film thickness of the adhering cathode layer and dc is the average particle diameter of the foregoing electrode constituent particles. Note that in the case of tc1>0.5dc, a gas diffusion property within the electrode is deteriorated and an electrical output of the single cell may be lowered, in the case of tc1<0.01dc, an adhesion effect may be insufficient.

Furthermore, the average diameter dc of general electrode constituent particles should be about 0.5 to 50 μm in terms of electrode performance and easiness of handling. Accordingly, the foregoing film thickness tc1 should be set to 0.1 μm $\leq tc1 \leq$ 5 μm. Note that in the case of tc1>5 μm, the gas diffusion property within the electrode is deteriorated and the electrical output of the single cell may be lowered, and in the case of tc1<0.1 μm, the adhesion efficiency may be insufficient.

The second embodiment in which the air electrode alone is formed by the adhering cathode layer and the electricity collecting cathode layer is described in the above. However, also the fuel electrode may be constituted by the adhering anode layer and the electricity collecting anode layer. In this case, the relation between the film thickness tc1 of the adhering cathode layer of the air electrode and the average particle diameter dc of the constituent particles, which are described in the above, can be similarly applied to the fuel electrode.

Specifically, a single cell structure should be adopted, which satisfies a relation expressed by ta1≦da where ta1 is the film thickness of the adhering anode layer of the fuel electrode, and the da is the average particle diameter of the particles of the fuel electrode. Furthermore, a single cell structure should be adopted, which satisfies a relation expressed by 0.01da≦ta1≦0.5 da where ta1 is the film thickness of the adhering anode layer of the fuel electrode and da is the average particle diameter of the particles of the fuel electrode. Still furthermore, the average particle diameter da of the constituent particles of the fuel electrode should be about 0.5 to 50 μm, and the film thickness ta1 of the adhering anode layer should satisfy the relation expressed by 0.1 μm≦ta1≦5 μm.

Next, a method of manufacturing the air electrode 25 of the single cell according to the second embodiment will be described.

This manufacturing method comprises a step (I) of forming a adhering cathode layer on a solid electrolyte layer, a step (II) of coating an electricity collecting cathode layer onto the adhering cathode layer, and a step (III) of baking the solid electrolyte layer and an air electrode material to adhere the air electrode material and the solid electrolyte layer to each other.

Here, in the step (I) of forming the adhering cathode layer on the foregoing solid electrolyte layer, a PVD method and a wet film formation method can be adopted. As the PVD method, there are, for example, a sputtering method, an EB deposition method, a laser beam abrasion method and the like. Moreover, as the wet film formation method, there are a printing method, a spray coating method, a sol-gel method, a plating method and the like.

Furthermore, in the step (III) of baking the solid electrolyte layer and the air electrode material to adhere the solid electrolyte layer and the air electrode material to each other, a baking temperature, that is, a heat treatment temperature at which the solid electrolyte layer and the air electrode are adhered to each other by the adhering cathode layer should be set to a range of 700 to 1000° C. In the temperature of less than 700° C., a single cell may be damaged during an operation. In the temperature 1000° C. or more, the material forming the adhering cathode layer becomes too soft, and the electrode material may move to cohere.

Furthermore, since the low melting point material such as Ag and bismuth oxide is used as the adhering cathode layer in the above baking, the baking is effective since the baking can be performed at a temperature which is lower by 200° C. or more than the lowest temperature among sintering temperatures for synthesizing respective material powders of the air electrode, the fuel electrode and the solid electrolyte layer. Note that the baking is performed at a temperature exceeding this temperature, a diffusion reaction proceeds between the solid electrolyte layer and the air electrode, a reaction product is formed at an interface between the solid electrolyte layer and the air electrode, and a cell output of the single cell may be lowered.

To be concrete, for example, a Ag film of a thickness of 2 to 3 μm is formed on the solid electrolyte layer formed of YSZ by use of the sputtering method, LSC powders are covered on the Ag film, and then they are baked at 850° C. Thus, the air electrode can be formed. By adopting such a manufacturing method, the single cell for the fuel cell which has excellent electricity generation performance and durability can be obtained.

There is no special limitation as to a manufacturing method of the fuel electrode. However, when the fuel electrode is constituted by the adhering anode layer and the electricity collecting anode layer, the foregoing manufacturing method of the air electrode can be applied thereto.

(Cell Plate for Fuel Cell and Fuel Cell)

Although a structure obtained by laminating the plurality of single cells of the first and second embodiments of the present invention can be used as the fuel cell, the plurality of single cells are arranged two-dimensionally, and then these single cells are processed to a united cell plate. A structure obtained by laminating the plurality of cell plates can be also used as the fuel cell.

Figure 3A:
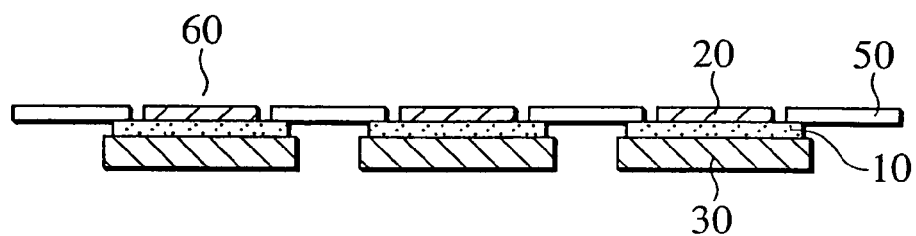
FIG. 3A is a section view of a cell plate of a fuel cell according to embodiments of the present invention.
Figure 3B:
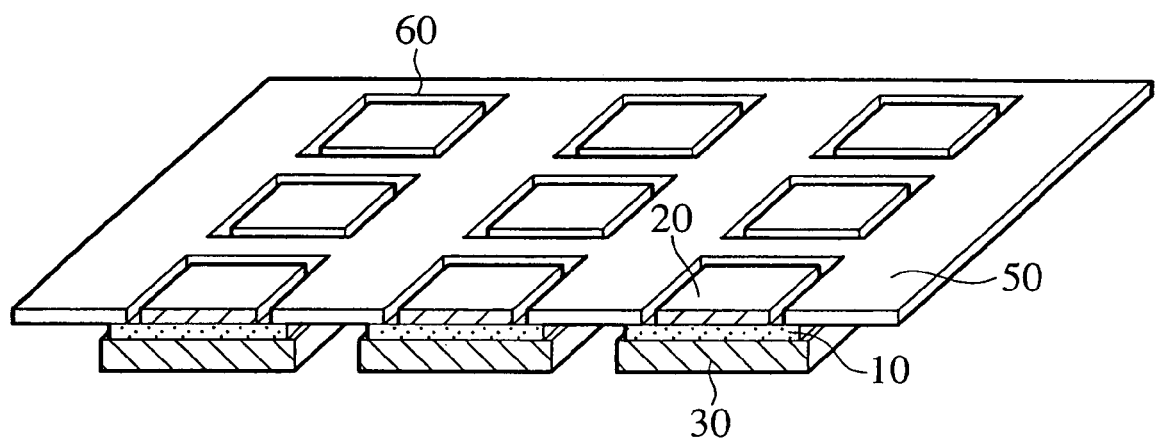
FIG. 3B is a perspective view of the cell plate of the fuel cell of FIG. 3A.

FIG. 3A is a partial section view showing an example of a cell plate for a fuel cell of an embodiment of the present invention, and FIG. 3B is a perspective view of FIG. 3A. As shown in FIG. 3A, in the cell plate, the plurality of openings 60 are provided in the substrate 50, and a single cell for a fuel cell composed of the solid electrolyte layer 10, the fuel electrode 20 and the air electrode 30 is arranged in each of the openings 60. As shown in FIG. 3A, when the plurality of single cells are arranged on the single common substrate 50, there is a merit that the solid electrolyte layer 10 of each single cell can be formed with a thin film.

Note that the fuel electrode 20 may be disposed under the solid electrolyte layer 10 and the air electrode 30 may be disposed on the solid electrolyte layer 10. In addition, any of the solid electrolyte layer 10, the fuel electrode 20 and the air electrode 30 may be used as a supporting plate without use of the substrate 50.

Furthermore, when the fuel cell is fabricated by laminating the single cells or the cell plates, the fuel electrode and the air electrode in each single cell or each cell plate must be arranged so as to contact flow paths of the reactive gas corresponding thereto. The plurality of single cells and the plurality of cell plates may be laminated so as to allow the fuel electrode to face another fuel electrode and to allow the air electrode to face another air electrode. In addition, in order to secure the flow path of the reactive gas, a separator may be interposed between the cell plates, if necessary.

To manufacture the solid oxide fuel cell, inorganic adhesive is coated onto surfaces of the plurality of the single cells or the cell plates, and a predetermined number of the single cells or the cell plates are laminated. Thereafter, the plurality of the single cells or the cell plates adhered, which are laminated, may be adhered to each other by pressurizing and heating.

EXAMPLES

Examples and comparative examples of the present invention will be described below.

In the examples and the comparative examples described below, the single cell for the fuel cell was fabricated, and performance evaluation for the single cell obtained was performed as described below.

Performance Evaluation Method

1. Tape Peeling-off Test Conditions

Scotch™ tape (manufactured by 3M Co. Ltd., type: Mending Tape 810) was pasted on the surface of the single cell, and the surface of the single cell on which the tape was pasted was pulled with force of 500 g at an angle of 45° relative to the surface of the single cell. When the peeling of the surface of the single cell did not occur, the evaluation was sorted to "◯" (Good).

2. Cell Property Evaluation Conditions

Cell properties of the fuel cell constituted by use of the single cell of each example were measured under the conditions that temperature was 700° C., fuel gas was hydrogen, oxidation gas was air, and gas pressure was 1 atm.

Note that measurements of the cell properties as to the examples 3 to 5 and the comparative examples 4 to 7 were performed under the conditions that an open voltage was 0.95 V and a maximum output was 0.11 W/cm².

3. Resistance Evaluation Conditions

As to the examples 3 to 5 and the comparative examples 4 to 7, as the resistance of the single cell and the resistance as to the adhering cathode layer, an AC impedance value at 700° C. was measured.

Fabrication of the Single Cell for the Fuel Cell

Example 1

Figure 4A:
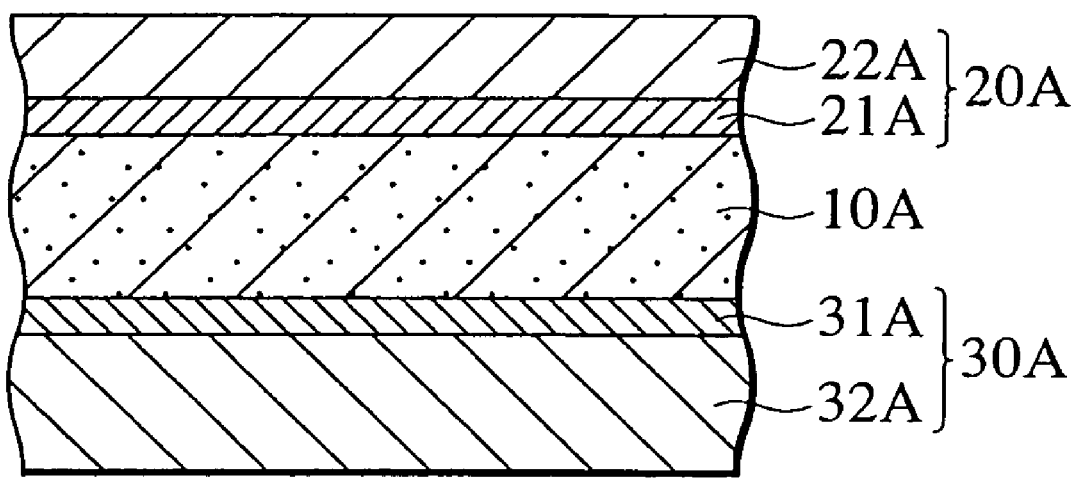
FIG. 4A is a section view of a single cell according to an example 1 of the present invention.

As shown in FIG. 4A, the single cell of the example 1 has the air electrode 20A composed of the adhering cathode layer 21A and the electricity collecting cathode layer 22A, which are formed on one surface of the solid electrolyte layer 10A and the fuel electrode 30A composed of the adhering anode layer 31A and the electricity collecting cathode layer 32A, which are formed on the other surface of the solid electrolyte layer 10A.

To be concrete, a zirconia sintered body containing yttria of 8 mol % (hereinafter referred to as "YSZ sintered body"), which has a thickness of 80 μm was used as the electrolyte layer, Ag was used as the air electrode, and Ni was used as the fuel electrode.

First, as the adhering cathode layer, a Ag layer having a thickness of 50 nm was formed on the upper surface of the plane-shaped YSZ sintered body by use of a rf sputtering method. A Ni layer having a thickness of 50 nm was formed on the lower surface of the YSZ sintered body by use of the sputtering method. Ar was used as sputtering gas, and gas pressure was set to 0.1 Pa. Sputtering power was set to 200 W.

Next, as the electricity collecting cathode layer, Ag paste containing Ag particles of a particle diameter of 8 μm was coated onto the adhering cathode layer to a thickness of about 30 μm by use of the spray coating method.

As the electricity collecting anode layer, Ni paste containing Ni particles of a particle diameter of 5 μm was coated onto the adhering cathode layer to a thickness of about 50 μm by use of the spray coating method. Here, as the sprayed paste, a compound was used, which is obtained by mixing Ag powders and Ni powders into a vehicle formed of butyl-carbitol (91.5) and ethyl cellulose (8.5) with a weight ratio of 1:2.5.

Thereafter, the YSZ sintered body in which each electrode layer was formed was baked at 600° C. A thickness of the electricity collecting cathode layer of the air electrode after baking was 15 μm, and a thickness of the electricity collecting anode layer of the fuel electrode was 35 μm.

The constitution of the electrode and the evaluation results are shown in Table 1 of FIG. 5.

Note that the adhering cathode layer of the air electrode of the single cell in the example 1 was a discontinuous film formed of particles having a particle diameter of 0.05 μm, a porosity of the Ag film in the electricity collecting cathode layer of the air electrode was 50%, and a porosity of the Ni film thereof was 45%, and the particles partially contacted with each other in the adhering cathode layer.

In the single cell of the example 1, the tape peeling test showed good adhesion. Moreover, the cell property was improved by about 8% compared to the fuel cell using the single cell obtained in the comparative example 1 to be described later.

Comparative Example 1

Figure 4B:
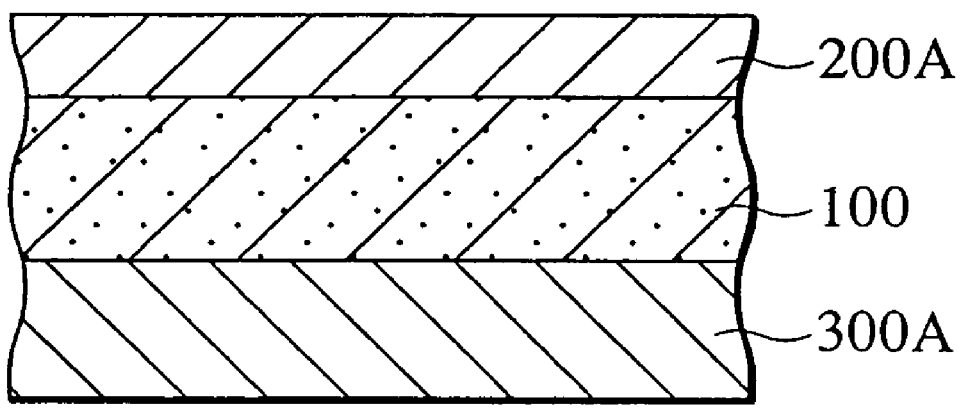
FIG. 4B is a section view of a single cell according to a comparative example 1.

As shown in FIG. 4B, the single cell of the comparative example 1 has the single-layered air electrode 200A formed on one surface of the solid electrolyte layer 100 and the fuel electrode 300A having a single-layered structure, which is formed on the other surface of the solid electrolyte layer 100.

The air electrode and the fuel electrode were formed by use of paste obtained by adding glass adhesive to Ag and Ni. The single cell of the comparative example 1 was fabricated by use of the same conditions as those of example 1 other than those under which the air electrode and the fuel electrode were formed.

To be concrete, as the air electrode, an Ag layer having a thickness of about 50 μm was formed on one surface of the YSZ sintered body by use of the spray coating method. As the fuel electrode, a Ni layer having a thickness of about 50 μm was formed on the other surface of the YSZ sintered body by use of the same spray coating method.

As the sprayed paste, a compound was used, which was obtained by mixing Ag powders and Ni powders into a vehicle formed of butyl-carbitol (91.5) and ethyl cellulose (8.5) with a weight ratio of 1:2.5 and by adding borosilicate glass offering softening temperature of 390° C. to Ag and Ni by 4%.

Thereafter, the YSZ sintered body onto which the Ag layer and the Ni layer were coated was baked in the atmosphere at temperature of 600° C. The thickness of the Ag layer after baking was 15 μm, and the thickness of the Ni layer after baking was 35 μm. The constitution of the electrode and the evaluation results are shown in Table 1 of FIG. 5.

The single cell of the comparative example 1 showed good adhesion in the tape peeling test. Moreover, with regard to the cell property, a cell output of 0.12 W/cm² hour (i=0.4 A/cm² hour) was obtained.

Example 2

The fundamental structure of the single cell of the example 2 is the same as that shown in FIG. 4A similarly to the single cell of the example 1. The single cell of the example 2 was fabricated under the same conditions as those of the example 1 except that the adhering cathode layer of the air electrode and the adhering anode layer of the fuel electrode were formed by use of the spray coating method.

To be concrete, as the adhering cathode layer, a Ag layer having a thickness of 0.5 μm was formed on one surface of the YSZ sintered body by use of the spray coating method. Similarly, as the adhering anode layer, a Ni layer having a thickness of 0.5 µm was formed on the other surface of the YSZ sintered body by use of the spray coating method. Thereafter, the adhering cathode layer and the adhering anode layer were baked in the atmosphere at temperature of 800° C. Thus, the respective thicknesses of the adhering cathode layer and the adhering anode layer were made equal to 0.1 µm.

Next, with Ag paste containing Ag particles of a particle diameter of 8 µm, the electricity collecting cathode layer having the thickness of about 30 µm was formed on the adhering cathode layer (Ag sprayed layer) by use of the spray coating method. Moreover, with Ni paste containing Ni particles of a particle diameter of 5 µm, the electricity collecting anode layer having the thickness of about 50 µm was formed on the adhering anode layer (Ni sprayed layer) by use of the spray coating method.

As the sprayed paste, a compound was used, which was obtained by mixing Ag powders and Ni powders into a vehicle formed of butyl-carbitol (91.5) and ethyl cellulose (8.5) with a weight ratio of 1:5. Moreover, Ag used for this paste has a particle diameter of 0.3 µm and 1 µm, and Ni was used as fine powders having a particle diameter of 0.7 µm.

Thereafter, the YSZ sintered body on which the sprayed film was formed was baked in the atmosphere at temperature of 600° C. With respect to the thickness of the adhering cathode layer after baking, the thickness of the Ag layer was 15 µm, and the thickness of the Ni layer was 35 µm. The constitution of the electrode and the evaluation results are shown in Table 1.

Note that the adhering cathode layer and the adhering anode layer were a discontinuous film formed of conductive particles having a particle diameter of 0.3 to 0.5 µm, a porosity of the electricity collecting cathode layer (Ag film) was 50%, and a porosity of the electricity collecting anode layer (Ni film) was 45%, and the particles partially contacted with each other in the adhering cathode layer.

In the single cell of the example 2, the tape peeling test showed good adhesion. Moreover, the cell property was improved by about 6% compared to the fuel cell using the single cell obtained in the comparative example 1.

Comparative Example 2

The fundamental structure of the single cell of the comparative example 2 is the same as that shown in FIG. 4B similarly to the single cell of the comparative example 1. The single cell of the comparative example 2 was fabricated under the same conditions as those of the example 1 except that an electrode having a single-layered structure was formed.

To be concrete, Ag paste containing Ag particles of a particle diameter of 8 µm was formed on one surface of the YSZ sintered body by use of the spray coating method, thus forming the air electrode having a thickness of about 30 µm. Moreover, Ni paste containing Ni particles of a particle diameter of 5 µm was formed on the other surface of the YSZ sintered body by use of the spray coating method, thus forming the fuel electrode having a thickness of about 50 µm.

As the sprayed paste, a compound was used, which was obtained by mixing Ag powders and Ni powders into a vehicle formed of butyl-carbitol (91.5) and ethyl cellulose (8.5) with a weight ratio of 1:2.5.

The YSZ sintered body on which the sprayed film was formed was baked in the atmosphere at temperature of 600° C. With respect to the thickness of the sprayed film after baking, the thickness of the Ag layer was 15 µm, and the thickness of the Ni layer was 35 µm. The constitution of the electrode and the evaluation results are shown in Table 1 of FIG. 5.

Note that in the foregoing sprayed film, the Ag layer (air electrode) showed porosity of 50%, the Ni layer (fuel electrode) showed porosity of 45% and the particles partially contacted with each other.

In the single cell of the comparative example 2, the tape peeling test showed partial peeling, and did not show sufficient adhesion. Moreover, the cell property was improved by about 3% compared to the fuel cell using the single cell obtained in the comparative example 1. This is because no intervention substance such as a glass adhesion material disturbing the cell reaction exists at the interface between the electrolyte and the electrode.

Comparative Example 3

Figure 4C:
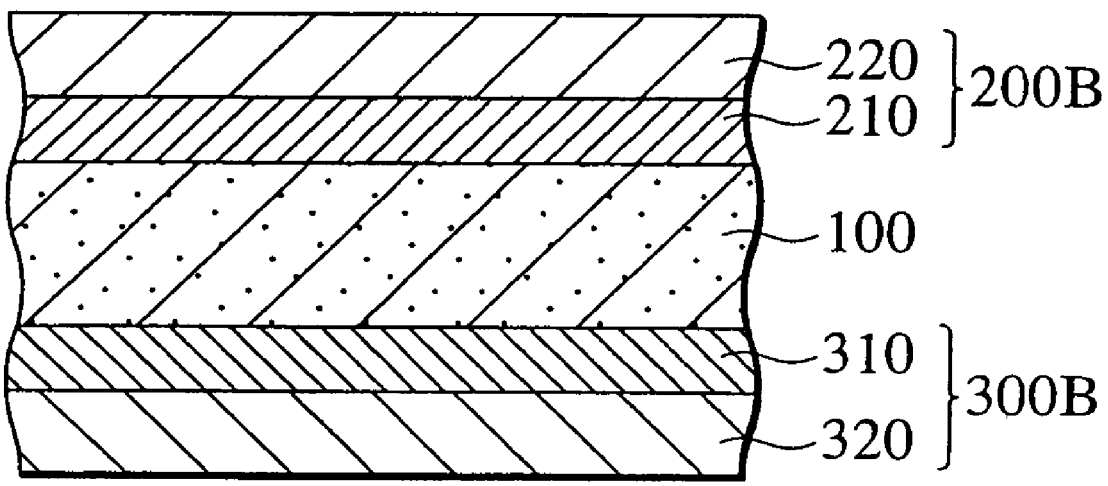
FIG. 4C is a section view of a single cell according to a comparative example 2.

The fundamental structure of the single cell of the comparative example 3 is shown in FIG. 4C. Similarly to the single cell of the example 1, the air electrode 200B and the fuel electrode 300B adopt the double-layered structure similarly to that of the example 1, respectively. However, the conditions as the film thickness of the single cell are different from those of the example 1. Thickness of the layers (210, 310) corresponding to the adhering electrode layers of the example 1 was set to 2 µm. Conditions other than the conditions as to the film thickness are the same as those of the single cell of the example 1.

To be concrete, a Ag layer having a thickness of about 2 µm was formed on one surface of the YSZ sintered body by use of a rf sputtering method, and a Ni layer having a thickness of about 2 µm was formed on the other surface of the YSZ sintered body by use of the rf sputtering method. The constitution of the electrode and the evaluation results are shown in Table 1.

Note that in layers (220, 320) corresponding to the electricity collecting electrode layer, the Ag film has porosity of 50%, and the Ni film has porosity of 45%, and particles partially contact with each other. Note that layers (210, 310) corresponding to the adhering electrode layers were a continuous layer formed of particles having a particle diameter of 0.1 to 0.5 µm.

Note that with regard to sputtering film formation conditions, Ar was used as sputtering gas, gas pressure was set to 0.05 Pa, and sputtering power was set to 800 W.

In the single cell of the comparative example 3, the tape peeling test showed partial peeling, and did not show good adhesion. Moreover, the cell property decreased by about 10% compared to the fuel cell using the single cell obtained in the comparative example 1. The cell reaction at the interface between the electrolyte and the electrode did not proceed sufficiently.

Example 3

Figure 4D:
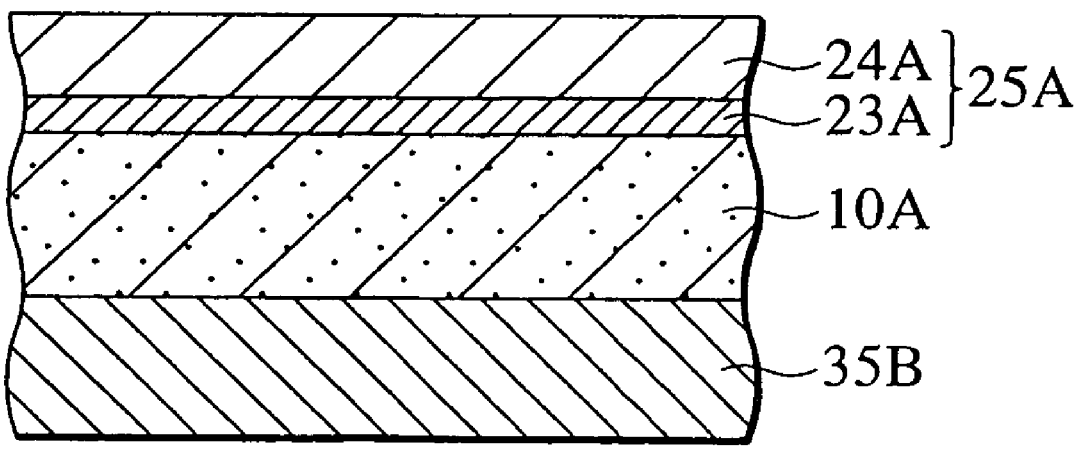
FIG. 4D is a section view of a single cell according to an example 3.

The structure of the single cell of the example 3 is shown in FIG. 4D. In the single cell of the example 3, a laminated structure was used as the air electrode 25A composed of the adhering cathode layer 23A and the electricity collecting cathode layer 24A. Moreover, $La_{0.3}CO_{0.7}O_3$ (LSC), which is a perovskite-type oxide electrode material, was used as the electricity collecting cathode layer 24A.

To be concrete, a plate of a sintered body formed of stabilized zirconia to which $Y_2O_3$ is added by 8 mol %

(hereinafter referred to as "8YSZ"), which has a thickness of 0.5 mm and a diameter of 15 mm, was first prepared as the solid electrolyte layer 10A.

Next, as an air electrode material, a $La_{0.3}Co_{0.7}O_3$ (LSC) sintered body was made by mixing prescribed raw materials at a prescribed ratio and by baking them in accordance with an ordinary manufacturing method of ceramics. Baking temperature was set to 1200° C. at this time. Thereafter, the LSC sintered body was ground by a ball mill, thus obtaining LSC powders having an average particle diameter of 5 μm.

As the adhering cathode layer 23A, a Ag layer having a thickness of about 1 μm was formed on surface of the foregoing 8YSZ sintered body by use of the sputtering method. Next, slurry obtained by dispersing the prepared LSC powders into turpentine oil (solvent) was coated onto the Ag layer that is the adhering cathode layer 23A, and the turpentine oil was dried. Thereafter, baking was performed.

Moreover, Ni paste was coated onto the other surface of the 8YSZ sintered body, and baked at 600° C., thus forming the fuel electrode 35B. The constitution of the electrode and the evaluation results are shown in Table 2 of FIG. 6.

Example 4

The fundamental structure of the single cell of the example 4 is the same as that of the example 3 shown in FIG. 4D. The same conditions as those of the example 3 were used except that a bismuth oxide layer was formed as the adhering cathode layer 23A of the air electrode. Note that the bismuth oxide layer was formed by use of an EB deposition method. The constitution of the electrode and the evaluation results are shown in Table 2 of FIG. 6.

Example 5

The fundamental structure of the single cell of the example 5 is the same as that of the example 3 shown in FIG. 4D. A mixed layer of Ag and LSC was used as the adhering cathode layer 23A of the air electrode. Furthermore, a thickness of the adhering cathode layer was set to 0.1 μm, and baking temperature was set to 800° C. The single cell was fabricated by using the approximately same conditions as those of the example 3 except the above. The constitution of the electrode and the evaluation results are shown in Table 2 of FIG. 6.

Comparative Example 4

The air electrode was formed in the form of the single layer structure formed of LSC without providing the adhering cathode layer. The baking temperature was set to 1100° C. The single cell was fabricated by using the approximately same conditions as those of the example 3 except the above. The constitution of the electrode and the evaluation results are shown in Table 2 of FIG. 6.

Comparative Example 5

The air electrode was formed in the form of the single layer structure formed of LSC without providing the adhering cathode layer. The single cell of the comparative example 5 was fabricated by using the approximately same conditions as those of the example 3 except the above. The constitution of the electrode and the evaluation results are shown in Table 2 of FIG. 6.

Comparative Example 6

The single cell of the comparative example 6 was fabricated by using the approximately same conditions as those of the example 3 except that a thickness of the adhering cathode layer was set to 10 μm and the baking temperature was set to 850° C. The constitution of the electrode and the evaluation results are shown in Table 2 of FIG. 6.

Comparative Example 7

The adhesive cathode layer was formed by bismuth oxide and glass frit. Moreover, the adhering cathode layer having a thickness of 2 μm was prepared by use of a printing method. The single cell of the comparative example 7 was fabricated by using the approximately same conditions as those of the example 3 except that the baking temperature was set to 500° C. The constitution of the electrode and the evaluation results are shown in Table 2 of FIG. 6.

As is understood based on Table 2, it is proved that the single cell and the fuel cell obtained in the examples 3 to 5 are excellent in the adhesion property and the cell resistance. On the other hand, it is proved that the single cell and the fuel cell obtained in the comparative examples 4 to 7 offer deteriorated adhesion property and high cell resistance because a conductive adhering layer is not used and the baking temperature is outside the preferable range of the present invention.

As described above, according to the present invention, since the electrodes (fuel electrode and air electrode) are formed in the laminated structure and the respective function is assigned to each layer constituting the lamination structure, it is possible to provide the single cell and the cell plate which offer low electrical resistance and good adhesion property and can take a large three-phase interface. Furthermore, the present invention can provide the method of manufacturing the same and the solid oxide fuel cell comprising the same.

The entire contents of Japanese Patent Applications P2001-9394 (filed on Jan. 17, 2001) and P2001-144550 (filed on May 14, 2001) are incorporated herein by reference. Although the inventions have been described above by reference to certain examples of the inventions, the inventions are not limited to the examples described above. Modifications and variations of the examples described above will occur to those skilled in the art, in light of the above teachings. For example, in the present invention, the shape and the like of the single cell and the cell plate can be selected arbitrarily, and the fuel cell in accordance with an objective output can be fabricated. Moreover, the air electrode and the fuel electrode can be formed also to a layered structure composed of more layers without limitation to the two-layered structure.

The scope of the inventions is defined with reference to the following claims.

What is claimed is:

1. A single cell, comprising:
   (a) a solid electrolyte layer;
   (b) an air electrode formed on one surface of the solid electrolyte layer; and
   (c) a fuel electrode comprising:
      an adhering anode layer formed on the other surface of the solid electrolyte layer and configured to show a function to allow the air electrode and the solid electrolyte layer to adhere electrically and mechanically to each other; and an electricity collecting anode layer formed on the adhering anode layer and configured to show an electricity collecting function, wherein the adhering anode layer is configured to provide a field for a three-phase interface composed of the solid electrolyte layer, reactive gas and the fuel electrode, the electricity collecting anode layer is thicker than the adhering anode layer, and has pores providing the reactive gas to the three-phase interface, and the thickness (ta1) of the adhering anode layer and an average diameter (da) of constituent particles of the fuel electrode satisfy a relation selected from the group of $ta1 \leq da$ and $0.01\ da \leq ta1 \leq 0.5\ da$.

2. The single cell according to claim 1, wherein the adhering anode layer contains conductive particles having a particle diameter of 0.5 μm or less; and the electricity collecting anode layer contains conductive particles having a particle diameter of 0.8 μm or more.

3. The single cell according to claim 1, wherein the adhering anode layer is a discontinuous thin film layer; and the electricity collecting anode layer has conductive particles forming a three-dimensional network structure.

4. The single cell according to claim 1, wherein electricity collecting cathode layer ranges from 1/1000 to 1/500.

5. The single cell according to claim 1, wherein the thickness (ta1) of the adhering anode layer is equal to 1 μm or less, and the thickness (ta2) of the electricity collecting anode layer is equal to 10 μm or more.

6. The single cell according to claim 1, wherein the electricity collecting anode layer has pores at a rate of 30 to 70 vol % of a total volume.

7. The single cell according to claim 1, wherein the electricity collecting anode layer is coated on the adhering anode layer to form a network.

8. The single cell according to claim 1, wherein the thickness (ta1) of the adhering anode layer is within a range of $0.1\ \mu m \leq ta1 \leq 5\ \mu m$.

9. The single cell according to claim 1, wherein p1 the adhering anode layer contains at least one metal selected from the group consisting of nickel, nickel-chromium alloy and nickel-iron alloy, or nickel oxide.

10. The single cell according to claim 1, wherein the electricity collecting anode layer contains at least one metal selected from the group consisting of nickel, nickel-chromium alloy and nickel-iron alloy, or nickel oxide.

11. A cell plate for a fuel cell comprising:

a plate-shaped body in which single cells, each single cell being as set forth in claim 1, are arranged two-dimensionally to be united.

12. A fuel cell comprising:

layered single cells, each single cell being as set forth in claim 1.

13. A fuel cell comprising:

layered cell plates, each cell plate being as set forth in claim 11.

* * * * *